United States Patent [19]

Peters

[11] Patent Number: 5,352,469

[45] Date of Patent: Oct. 4, 1994

[54] METHOD FOR RECOVERING AND RECYCLING OF FOOD PRODUCTS FROM NON-METALLIC CONTAINERS

[75] Inventor: Thomas J. Peters, Denver, Colo.

[73] Assignee: SSDE Technologies Corporation, Denver, Colo.

[21] Appl. No.: 966,872

[22] Filed: Oct. 26, 1992

Related U.S. Application Data

[63] Continuation-in-part of Ser. No. 790,368, Nov. 12, 1991, Pat. No. 5,230,917.

[51] Int. Cl.$^5$ ............................ A23P 1/00; B03C 1/00
[52] U.S. Cl. ..................................... 426/478; 209/3.1; 209/215; 241/20; 241/24; 426/516; 426/635
[58] Field of Search ............... 426/478, 479, 506, 516, 426/635; 99/484; 209/3.1, 215, 636; 241/20, 24

[56] References Cited

U.S. PATENT DOCUMENTS 4,967,912 11/1990 Schonberg ..................... 209/215

*Primary Examiner*—George Yeung
*Attorney, Agent, or Firm*—John E. Reilly

[57] ABSTRACT

Food and other contents of non-metallic containers are recovered from the containers by cutting the container bodies into fragments, advancing along a vibrating conveyor section through a liquid spray while simultaneously tumbling the fragments and the contents, continuing to advance the fragments and contents across strainer sections in the conveyor section to remove at least a part of the contents, lifting the fragments off of the conveyor section and advancing along a separate path of travel away from the conveyor section for collection together with any fragments and food contents remaining on the conveyor section after passing over the strainer sections. In converting food contents into usable food or feed values, the contents recovered through the strainer sections may be dried to reduce their moisture level either by mechanical dehydration or the addition of bulking agents, or both, and may be advanced through an extruder to convert the dried food contents into a complete ration.

15 Claims, 3 Drawing Sheets

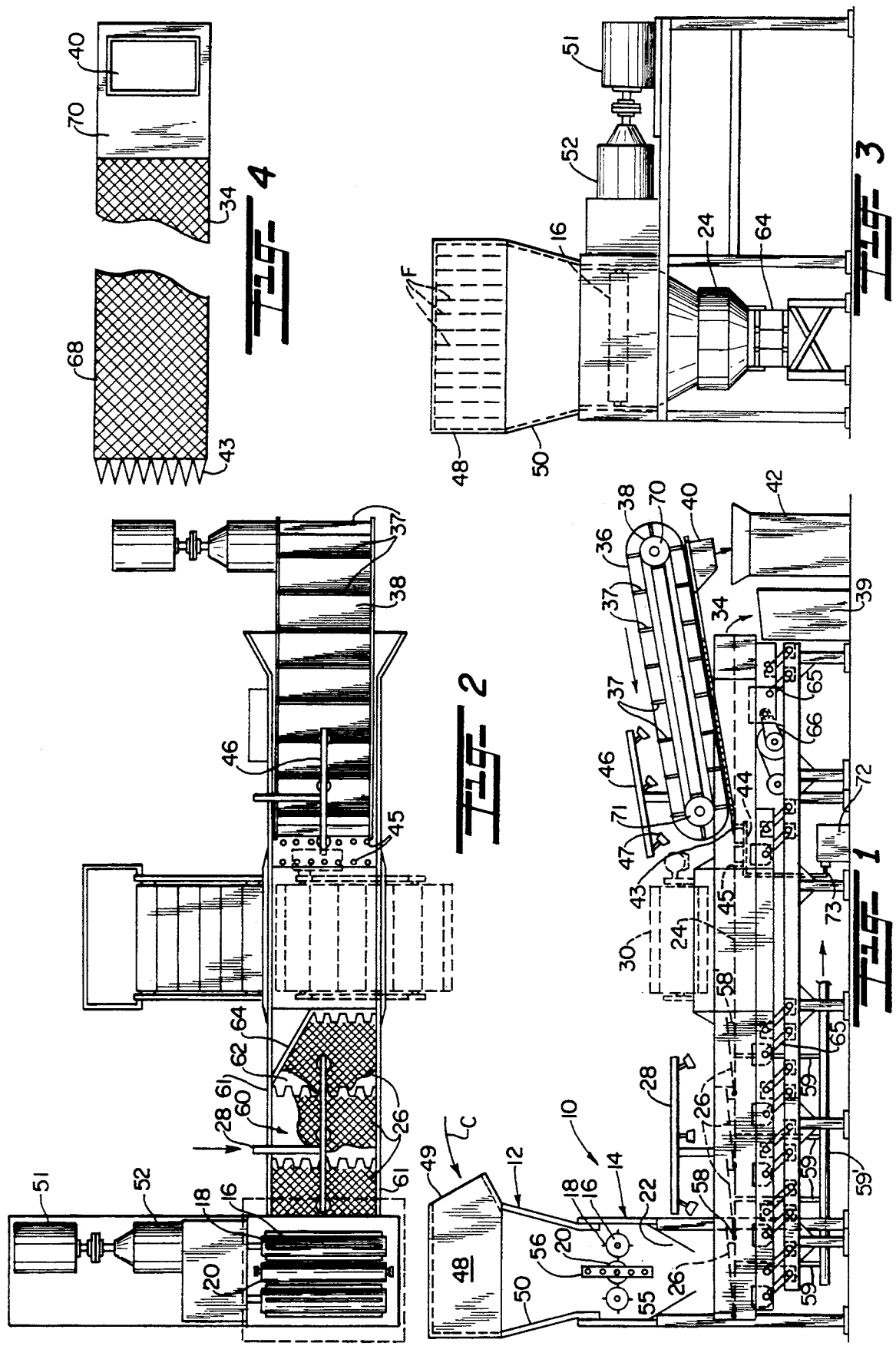

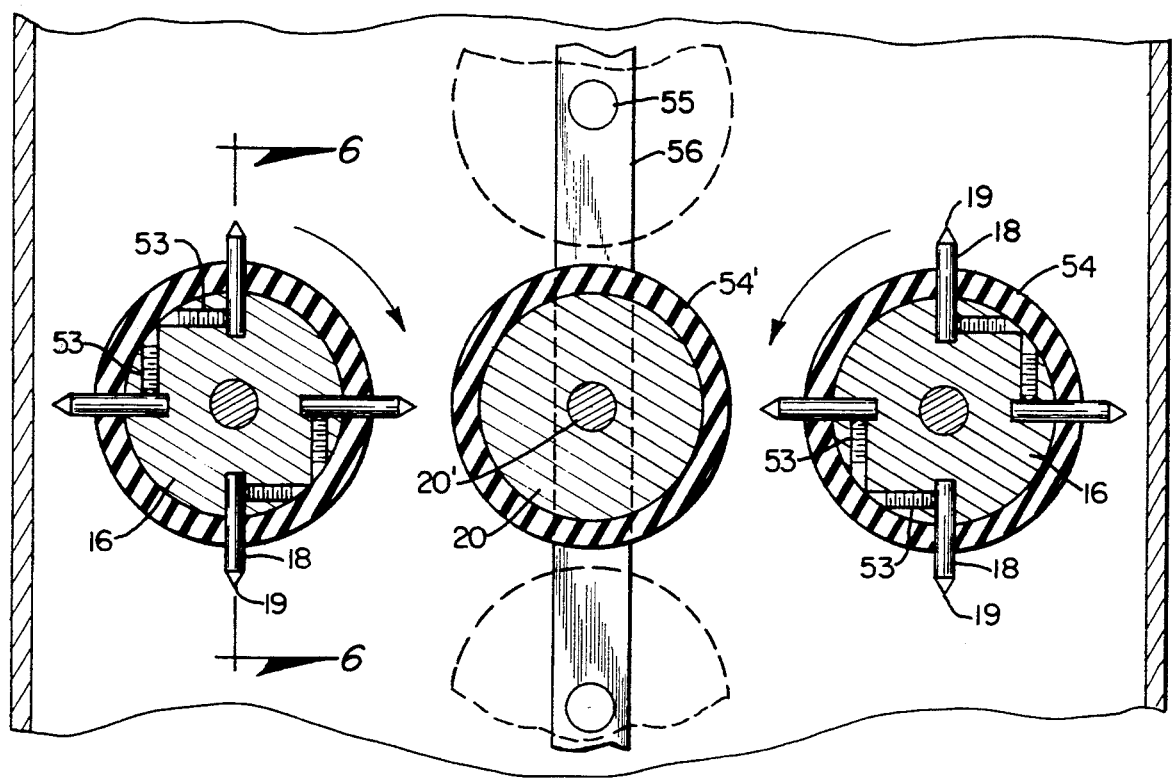
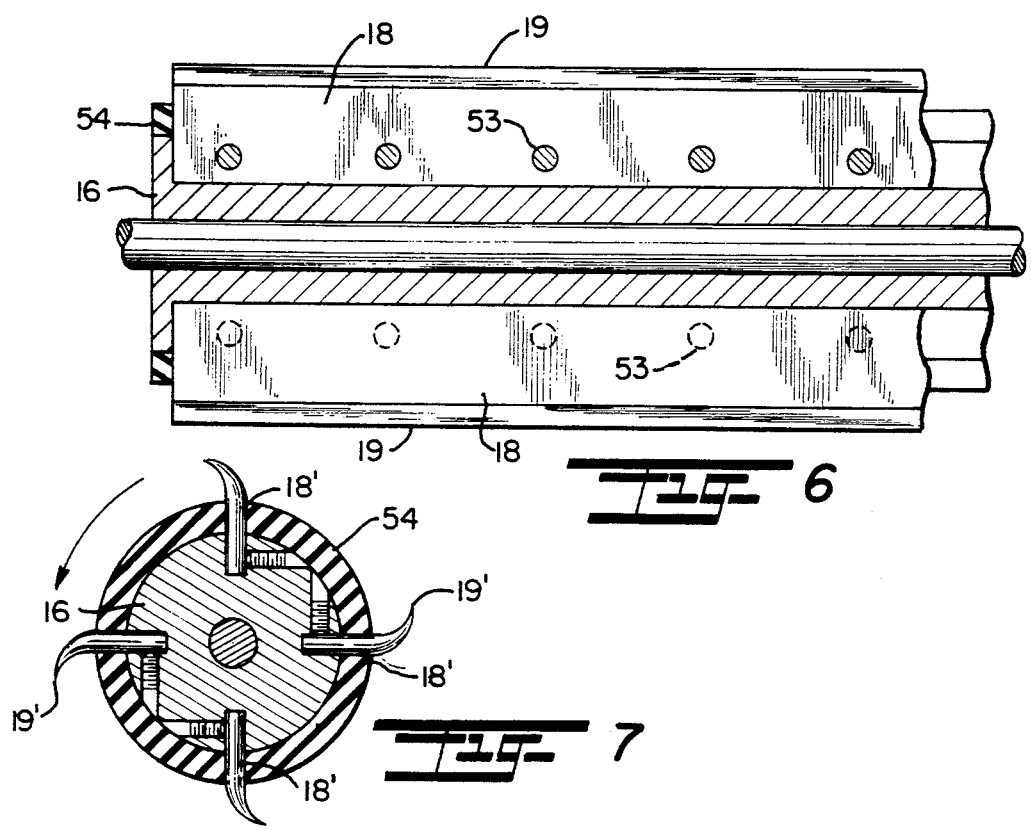

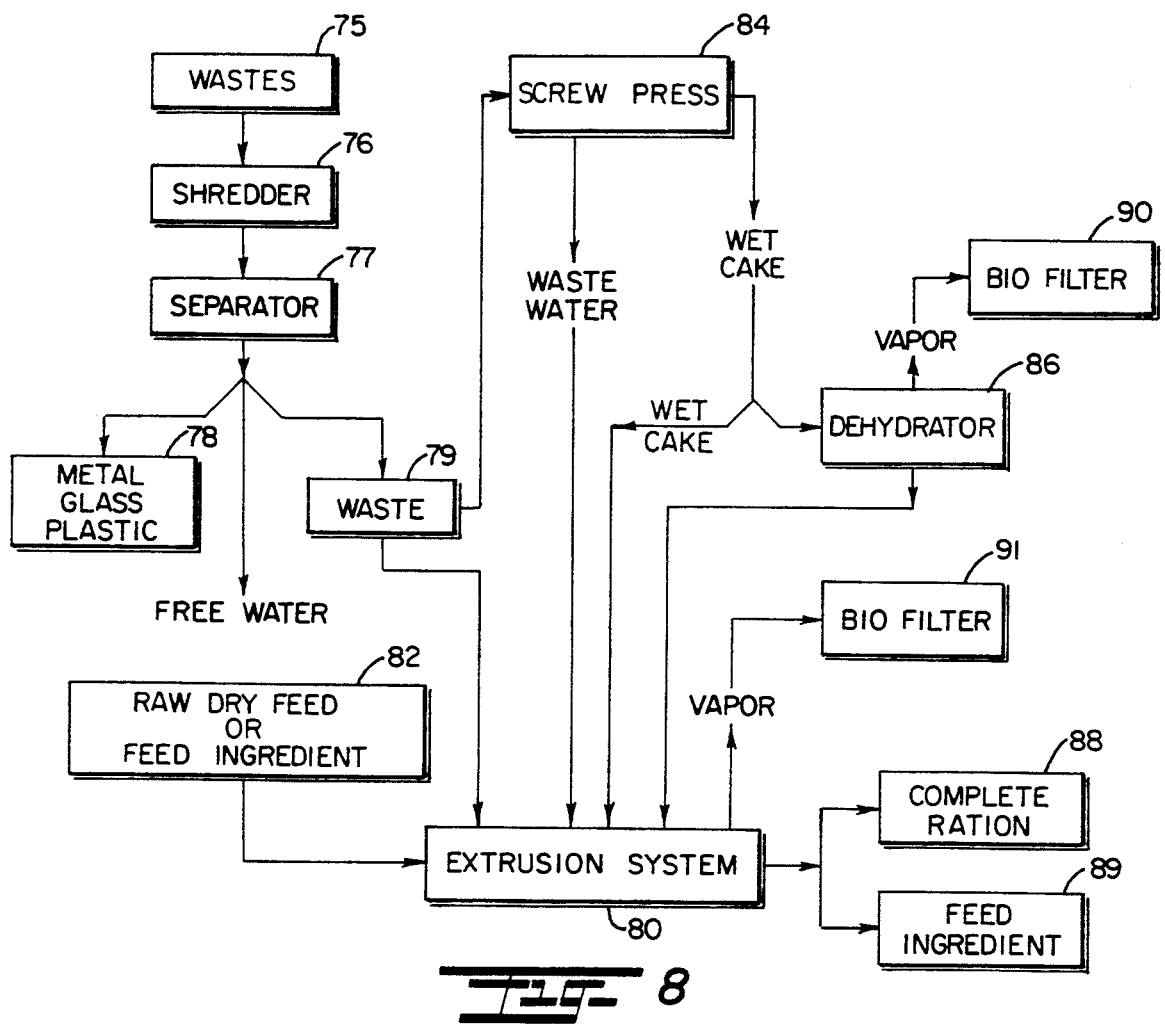

METHOD FOR RECOVERING AND RECYCLING OF FOOD PRODUCTS FROM NON-METALLIC CONTAINERS

CROSS-REFERENCE TO RELATED APPLICATIONS

This application is a continuation-in-part of Ser. No. 790,368, filed Nov. 12, 1991 for METHOD AND APPARATUS FOR SEPARATION OF CANNED GOODS AND RECLAIMING USEFUL FOOD VALUES THEREFROM, by Thomas J. Peters, now U.S. Pat. No. 5,230,917.

SPECIFICATION

This invention relates to a method and apparatus for recycling packaged goods; and more particularly relates to a novel and improved method and apparatus for the recovery of useful food or feed values from non-metallic containers.

BACKGROUND OF THE INVENTION

The accumulation of waste materials is becoming an increasingly serious problem throughout the world. A major contributor to this problem is the accumulation of various packaged goods and particularly food which is packaged in metallic and non-metallic containers and which, when discarded occupy an inordinate amount of space. Furthermore, packaged food which is permitted to accumulate as waste can lead to contamination of the earth and ground water after it has deteriorated over an extended period of time.

It has been proposed to recycle refuse into fertilizer by various methods, such as, disclosed in U.S. Pat. Nos. 3,653,871 and 3,736,120 to A. Tempe. Also, it has been proposed to subject cans to a shredding process primarily for the purpose of separation of paper labels from the cans as proposed in U.S. Pat. No. 4,988,044 to D. H. Weitzman et al. U.S. Pat. No. 4,284,514 to D. R. Wright is similarly directed to a method of rupturing containers for the purpose of treating the material inside the container but does not suggest a satisfactory way of separating the material inside of the container from the metal so that it can be recycled or converted into useful feed values. Moreover, it has been proposed to recycle materials, such as, hide waste materials combined with starch through the combined steps of dehydration and extrusion, for example, as suggested in U.S. Pat. No. 4,702,929 to C. J. Lehn et al. Other patents of interest in this area are U.S. Pat. Nos. 2,905,557 to J. Degenhardt, 3,930,799 to E. W. Eweson and 3,971,306 to F. D. Wiese et al. To my knowledge, however, no one has satisfactorily devised a process and apparatus for fragmenting non-metallic containers to remove the contents for conversion into useful byproducts and particularly in such a way that the process can be carried out in a high speed, closely coordinated sequence of steps.

The separation of contents from nonmetallic containers requires somewhat different considerations than those for metallic containers, particularly in the respect that non-metallic containers are customarily composed of glass, paper or plastic which will tend to shatter into extremely small pieces making it very difficult to separate those pieces from the contents; and further, owing to the fact that non-metallic materials cannot be magnetically separated from the contents exacerbates the problem of removal of the shattered pieces or fragments from the contents.

SUMMARY OF THE INVENTION

Accordingly, an object of the present invention is to provide for a novel and improved method and apparatus for the conversion of waste material into useful end products.

Another object of the present invention is to provide for a novel and improved method and machine for the efficient separation of containers from their contents in an economical and reliable manner.

A further object of the present invention is to provide for a novel and improved method and apparatus for the separation of containers from their contents in which the containers are composed primarily of non-metallic materials, such as, plastic, paper or glass which can be shattered or divided into fragments together with the efficient removal of such fragments from the contents of the containers.

It is a still further object of the present invention to provide for a novel and improved method and machine for separation of food wastes from containers composed primarily of non-metallic materials so that the food wastes can be converted into animal feed or other useful by-products.

An additional object of the present invention is to provide for a novel and improved method and machine for the efficient separation of containers from their contents and the high speed conversion of the contents into useful end products in a closely coordinated sequence of steps.

In accordance with the present invention, a method of separating non-metallic container bodies and their contents comprises the steps of cutting the container bodies into fragments whereby to expose their contents, spraying the fragments and contents with liquid to encourage the separation of the contents from the fragments, mechanically separating the container bodies from the contents according to size for separate recovery from the fragments, and drying the contents to reduce the moisture content to a predetermined level. Preferably, the fragments and contents are simultaneously tumbled and sprayed, following which the fragments are lifted away from the contents for advancement along a separate path of travel.

In the system for separating contents from the container bodies, fragmentizing means are provided for dividing the container bodies into fragments, and tumbler means together with liquid spray means are provided for simultaneous tumbling and spraying of the fragments and contents, separating means are provided for mechanically separating the fragments from the contents, and strainer means for separating collecting particles less than a predetermined size from the contents after separation of the fragments therefrom. Depending upon the use to which the contents are to be put, such as, for example, in the preparation of useful feed values, means are provided for drying the contents after removal of the fragments, and extruder means are provided for extruding the contents under heat and pressure.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a side view schematically illustrating a preferred form of machine in accordance with the present invention;

FIG. 2 is a top plan view of the preferred form of machine illustrated in FIG. 1;

FIG. 3 is a front view of the machine shown in FIGS. 1 and 2;

FIG. 4 is a detailed view in plan of a portion of the conveyor section of the machine;

FIG. 5 is a detailed enlarged view partially in section of the preferred form of fragmentizing stage employed in the machine of the present invention;

FIG. 6 is a somewhat fragmentary view partially in section taken about lines 6—6 of FIG. 5;

FIG. 7 is another view partially in section of a modified form of a knife roller to be employed in the fragmentizing stage; and FIG. 8 is a flow diagram of a preferred form of process for the separation of food contents from their containers and conversion into useful feed values.

DETAILED DESCRIPTION OF THE PREFERRED EMBODIMENT

Referring to the drawings, there is illustrated in FIGS. 1 to 5 a preferred form of apparatus for the recovery of waste food materials from non-metallic containers and which, by way of illustrative example, will be described in connection with the conversion of the food contents into animal feed. Typically, such non-metallic containers are composed of glass or plastic materials and which may or may not have a metallic cover or cap. The preferred form of apparatus 10 is intended for high volume usage in which containers as represented at C are loaded in mass quantities into an enclosed hopper 12 for delivery through a fragmentizing stage represented at 14, the latter having a pair of counter-rotating rollers 16 provided with a plurality of knife members 18. When rotated in the direction illustrated in FIG. 1, the counter-rotating knife members 18 will encourage the downward movement of the containers C therebetween, and a central guide roller 20 is adjustably mounted between the drive rollers 16 to cause the containers to be crushed as they are simultaneously ruptured or divided by the knife members 18 into fragments so as to expose the contents of the containers. These fragments and contents are free to advance by gravity downwardly through a chute 22 onto one end of a conveyor system which includes a shaker table 24. A plurality of ramps 26 are disposed at the leading end of the table 24 beneath an overhead spray section 28 to tumble the mass of fragments and food contents discharged from the lower discharge end 22 of the hopper 12 as a preliminary to advancement through a magnetic separator section 30. The magnetic separator will in a manner described in my hereinbefore referred to copending application for patent Ser. No. 790,368 remove any metallic particles from the mass, advance and deposit into a separate conveyor section 32.

In order to mechanically separate the food contents from the container fragments, lift means is provided in the form of an inclined strainer section 34 and a correspondingly inclined tractor drive 36 for advancing the container fragments and a small amount of the food contents upwardly along the strainer section 34. The strainer section is sized to pass food particles less than a given size downwardly onto the shaker table 24 where they are advanced and collected in a first collection area 39; and the container fragments will continue to be advanced along the strainer section and deposited into a chute 40 at the upper end of the lower course of the tractor drive for collection into a second collection area 42. Lifting of the fragments and food particles is aided by a fluid spray 44 at the lower entrance end of the strainer section 34, and a plurality of fingers 43 spaced transversely across the lower edge of the strainer section 34 to encourage the fragments and contents to advance upwardly along the strainer section so that they are engaged by a series of transversely extending cleat members 37 at spaced intervals along the length of an endless conveyor belt 38 which forms a part of the tractor drive. A water spray section 46 is positioned above the lower end of the tractor drive to direct water downwardly at the leading end of the strainer section 34 to intermix with the food particles and carry them through the strainer section 34.

Considering in more detail the construction and arrangement of the hopper section 12, an upper enclosure 48 includes a limited opening 49 for introduction of the containers downwardly through a downwardly convergent delivery section 50 which guides the containers into the fragmentizing section or stage 14. Although the opening 49 is illustrated as being located over the ramp section 26, it will be appreciated that the opening 49 or entrance may be located either in the opposite end wall, one of the sidewalls or top of the section 48. In a well-known manner, a curtain in the form of rows of flexible straps F may be freely suspended in horizontally spaced relation to one another throughout the interior of the upper enclosure to discourage any backward flow or movement of the containers as well as to reduce the noise level. A drive motor 51 operates through a speed reducer 52 to counter-rotate the rollers 16 in the direction of the arrows, as illustrated in FIG. 1, and any suitable form of sensing means, not shown, may be employed to measure resistance on the shafts to prevent overloading. As best seen from FIGS. 5 and 6, each of the shaft members 16 includes an outer flexible sleeve 54 of a rubber or rubber-like material and radially extending, circumferentially spaced knife members 18 each extend the substantial length of the shaft and are provided with pointed edges 19 at their radially outer terminal ends. Each knife member 18 is locked in place by means of an Allen bolt 53 which extends through the roller 16 in a direction perpendicular to the knife member 18 and which is threaded tightly against the base of each knife member. In the preferred form, a series of four knife members are circumferentially spaced at 90° intervals around each roller although the spacing may be suitably varied according to the size and composition of the container goods. The central guide roller 20 is similarly covered with an outer flexible sleeve 54' and, in this relation, the sleeve members 54 and 54' operate to cushion and reduce the noise level as the containers are engaged by the knife members. The central guide roller 20 includes an inner shaft 20' having opposite ends journaled in openings 55 of adjustment bars 56 at each end of the hopper. In this way, the guide roller 20 can be vertically adjusted with respect to the drive members 16 to regulate the spacing between the guide roller 20 and each of the drive rollers 16 for advancement of the container bodies. Typically, the guide roller 20 is positioned such that the spacing from each drive roller 16 is one-half to three-quarters smaller than the size of the container so that each container can be compressed somewhat as it is forced against the knife members to split or sever the container body into fragments and expose the contents.

The resultant fragments and contents advance by gravity through the lower discharge end 22 which is in the form of a downwardly convergent chute onto the first of a series of the ramps 26. Preferably, each of the ramps 26 is in the form of a flat screen or filter having a lower end pivotally mounted as at 58 to the top surface of the shaker table 24. The ramps 26 are provided with flexible claws or ribs 26' at their upper ends which are disposed in slightly overlapping relation to each next successive ramp 26. Suitable adjustment means, such as, adjustment arms represented at 58' are provided to lock the ramps at a selected, acute angle to the horizontal. Openings 59 covered with screens are provided in the shaker table beneath the ramps 26 so that, as the contents and fragments are sprayed by the overhead water spray nozzles 28, the water along with any of the smaller particles of food passing through the screen will be carried downwardly through the openings 59 into a con, non drain line 59'. Preferably, the water spray section 28 is comprised of a series of high pressure nozzles which are disposed at different angles to the path of advancement of the fragments and contents so as to encourage the fragments and contents to move in a variety of directions and undergo further separation as they are simultaneously sprayed, vibrated and tumbled.

A preferred form of shaker table 12 is of the type described in my hereinbefore-referred to copending application for patent Ser. No. 790,368 and therefore will not be described in detail. Broadly, however, it includes an elongated trough 60 having opposed sidewalls 61 and a bottom portion 62 which is provided with the openings 59 as previously described. The trough or channel is mounted on spring-loaded stabilizer arms 65 which are operated by a common eccentric drive 66 toward the discharge end of the table to impart an oscillatory or vibrating motion to the trough causing the fragments and contents to be tumbled as they are advanced upwardly along the ramps 26 and through the high pressure water spray section 28. The trough 60 is preferably inclined at a low gradual angle away from the hopper end toward the opposite discharge end, such as, on the order of 1.5°. The larger fragments and contents continue to advance from the ramp sections 26 along the trough 60 into the magnetic separator stage 30; and a guide wall 64 in the trough may be added to cause the material to converge into a narrower trough section for advancement beneath the magnetic separator section 30.

The magnetic separator 30 is preferably a Model 100 Stearns, manufactured by Stearns Manufacturing of Cudahay, Wisconsin and operates to remove any of the metallic particles, such as, lids or caps from the mass of fragments and contents flowing along the trough 60, and the section 30 is illustrated in more detail in my hereinbefore-referred to copending application Ser. No. 790,368. In high volume separation, it is desirable to employ the side discharge conveyor 32 for separate removal and collection of the metallic particles from the separator section, or the metallic particles may merely be permitted to advance into one side of a split trough section as illustrated in copending application Ser. No. 790,368. Furthermore, when the side discharge conveyor 32 is employed for high volume separation, the wall 64 may be removed and the full width of the trough section utilized in advancing the fragments and contents into the magnetic separator section 30. Further, although not illustrated, a strainer section may be employed directly beneath the magnetic separator section for drainage of liquid from the trough.

Strainer section 34 inclines upwardly at a low angle away from the bottom surface 62 of the trough 60 and includes an outer generally rectangular frame 68 for interchangeable insertion of filters of a selected mesh size according to the size of the contents being processed. The strainer terminates at a point directly above the exit end of the trough so that any remaining fragments and other particles not strained through the filter are advanced over a solid plate 70 and into the discharge chute 40 for recovery in the collection area 42. Typically, the mesh size of the filters will be in the range of 5 mesh to 20 mesh and the glass or plastic container bodies are fragmented to approximately ¾" by 1.5". In turn, the tractor drive 36 includes a drive pulley 70 and follower pulley 71 for the endless conveyor belt 38 which is preferably in the form of a rubber-reinforced flat belt having rubber or rubber-like flexible cleat members 37. The cleat members 37 traverse the width of the belt and advance the material upwardly along the strainer section 34 while minimizing any breakage or further fragmentation of the container bodies. In order to encourage movement of the fragments and contents onto the strainer section, the fingers 43 are disposed along the lower edge of the strainer section 34 and are tapered downwardly and forwardly toward the discharge end and rest on the trough surface 62 to effectively scrape and advance the material upwardly into the strainer section. Lifting of the materials onto the strainer section is aided by the fluid spray 44 which preferably comprises a series of nozzles 45 in communication with a source of compressed air 72 via hose 73. The nozzles are arranged to extend across the entire width of the trough 62 and to direct the air under pressure upwardly across the path of movement of the fragments and contents as described.

The water spray section 46 comprises a series of nozzles corresponding to the water spray section 28 and wherein nozzles 47 are angled somewhat toward the direction of travel of the paddle or cleat members 37 so that the space between cleat members and opposite sidewalls of the tractor drive will collect the water just prior to their downward travel into engagement with the fragments and contents being lifted onto the strainer section. The addition of water at this point will greatly aid in effectively washing any contents away from the fragments and encourage their movement through the filter; and, of course, the water will be free to pass through the filter along with the contents.

In the treatment of different packaged goods, variations may be made in the size and configuration of knife members to most effectively fragmentize the container bodies. For instance, knife members with relatively blunt ends have been found to be most effective for glass containers; however, as shown in FIG. 5A, bent or hooked ends 19' are most effective for corrugated paper containers in exposing the contents for the spray/tumbling operation along the ramp sections 26. The water spray will effectively carry any liquid contents through the mesh-like ramps and be delivered into the drain line 59' for recycling and reuse of the water at the water spray sections 28 and 46. After passing through the magnetic separator section 30, the fragments and contents are further separated with the glass or plastic being lifted and sprayed at the lower end of the tractor drive, then deposited at the upper end of the tractor drive through the chute 40. The container contents will continue to pass along the strainer section and be carried with the water from the water spray section 46 through the strainer 34 onto the trough or conveyor section 24 for recovery in the collector or bin 39. Both bins 39 and 42 may be in the form of wheeled carts to facilitate removal of the materials for further treatment or disposal.

FIG. 7 illustrates the method of packaged food recycling in accordance with the present invention wherein the containers C and their contents represented at 75 are advanced into shredder 76 and specifically the fragmentizing stage 14 as described. The fragments and contents are then advanced through the separator stage 77 consisting of the ramps 26 and water spray section 28 followed by the magnetic separation stage 30 and the strainer section 34. Thus, the metal, glass or plastic fragments are separated as designated at 78 from the contents as designated at 79.

In order to convert the contents into useful by-products, the contents may be delivered directly into an extrusion system designated at 80 and combined with a dry feed or feed ingredient represented at 82. As a suitable alternative, all or a portion of the contents as collected at 79 may be directed into a screw press 84 for separation into waste water supplied to the extrusion system and the more solid mass or feed materials in the form of a wet cake. As illustrated, the "wet cake" may either be delivered directly into the extrusion system or to a dehydrator stage 86. In the dehydrator stage, specialized equipment is employed to extract the liquid from the food product and eliminate the need for a bulking agent. For instance, a bulking agent may be used to effectively reduce the moisture in the contents in smaller plants that extrude in the range of 10 tons to 20 tons per day, and the dehydration stage would be used in plants processing more on the order of 100 tons or more per day. The resultant product from the dehydration stage 86 is once again delivered into the extrusion system where it may be processed alone or combined with a feed ingredient, then further conditioned to form a complete ration as designated at 88 or as a feed ingredient as designated at 89. Suitable biofilters as represented at 90 and 91 are provided to recover any vapor formed in the dehydration stage 86 and extrusion stage 80, respectively.

A preferred form of extruder for the extrusion stage 80 are the Models 165 and X185 manufactured and sold by Wenger Manufacturing of Sabbatha, Kans. and which is a wet and dry extrusion process in which friction, water and steam are combined to effectively cook the material in an oxygen-free atmosphere up to temperatures in the range of 250° F. to 300° F. The combined heat and pressure operate to destroy bacteria, mold and yeast; any enzymes are inactivated to stabilize the product against destruction of its nutritional values. Important to the extrusion process is the close control maintained over the moisture content of the food products and any bulking agent combined with the food or waste products. It is desirable to reduce the moisture in the waste or contents preliminary to delivery into the extrusion system to a level on the order of 35% moisture content. It will be necessary to dry the waste products down to 7% to 10% moisture content through dehydration and store the product. Later when desired to extrude the product into a feed material, it may be desirable to add water to the dried product.

The type of container body to be shredded will determine whether a dehydrator or extruder or both pieces of equipment is needed. In the case of glass, it is virtually impossible to remove all glass fragments and therefore only a dehydrator would be required to convert into fertilizer. Some food in plastic and corrugated paper containers can be completely separated in which event an extruder would be utilized to convert into useful feed values. Ferrous metal lids can be removed by utilizing the magnetic separator and, if the lid is aluminum or plastic, the tractor drive can be utilized to remove the lids along with the fragments.

It is therefore to be understood that while a preferred method and apparatus are herein set forth for recovery and recycling food products from non-metallic containers, various modifications and changes may be made therein without departing from the spirit and scope of the invention as defined by the appended claims and reasonable equivalents thereof.

I claim:

1. The method of separating non-metallic container bodies and their food contents comprising the steps of:
    (a) cutting and crushing said container bodies into fragments whereby to expose said contents;
    (b) spraying said fragments and said contents with liquid to facilitate the separation of said contents from said fragments;
    (c) mechanically separating said fragments from said contents according to size for separate recovery from said fragments; and
    (d) drying said contents to reduce the moisture content therein to a predetermined level.

2. The method according to claim 1, in which step (b) is characterized by simultaneously tumbling and spraying said container fragments and said contents.

3. The method according to claim 1, wherein step (c) is further characterized by advancing said fragments away from said contents along a separate path of travel.

4. The method according to claim 1, including the step of magnetically separating any ferrous metal fragments from said fragments and said contents prior to step (d).

5. The method according to claim 1, in which step (d) is characterized by dehydrating said contents for a predetermined time interval whereby to reduce the moisture content to a predetermined level.

6. The method according to claim 1, wherein step (d) is characterized by introducing a bulking agent into said contents and blending said bulking agent and said contents into a homogenous mass.

7. The method according to claim 6, in which said bulking agents are selected from the group consisting of shredded cardboard, soybean, corn, paper and cereal grains.

8. The method according to claim 1, including the step of extruding said contents at an elevated temperature and pressure after step (d).

9. The method according to claim 8, including the step of cooling said extruded contents and reducing to particle form.

10. A method of treating waste food products contained in non-metallic containers comprising the steps of:
    (a) cutting and crushing said containers into fragments whereby to expose the food contents thereof;

(b) tumbling said fragments and contents along a first path of travel to facilitate initial separation therebetween;

(c) mechanically separating said fragments from said contents according to size and directing the larger of said fragments along a second path of travel;

(d) straining any remaining fragments and contents less than the predetermined size to remove from said first path of travel; and (e) separately removing any of said fragments and contents not strained for collection away from said second path of travel.

11. The method according to claim 10, in which step (b) is further characterized by subjecting said fragments and said contents to vibration.

12. The method according to claim 10, in which step (c) is further characterized by directing air under pressure upwardly through said fragments and said contents and lifting said fragments away from said contents.

13. The method according to claim 12, in which step (c) is further characterized by spraying said fragments as they are directed along said second path of travel.

14. A method according to claim 13, including the step of drying said contents recovered in step (d).

15. A method according to claim 14, including the step of magnetically separating any ferrous metal from said fragments and contents and advancing the metal separated along a separate path of travel.

* * * * *